(12) United States Patent
Davis et al.

(10) Patent No.: US 7,117,799 B2
(45) Date of Patent: Oct. 10, 2006

(54) OVERHEAD MATERIAL HANDLING SYSTEM AND TRACK BLOCK

(75) Inventors: Richard J. Davis, Rowlett, TX (US); Leonard Paul Siemantel, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/863,937

(22) Filed: Jun. 9, 2004

(65) Prior Publication Data

US 2005/0274276 A1    Dec. 15, 2005

(51) Int. Cl.
*B61B 3/00*    (2006.01)

(52) U.S. Cl. ............ 104/89; 104/250; 104/88.02; 320/109

(58) Field of Classification Search ............ 104/89, 104/258, 99, 249, 250, 88.03, 88.02; 700/228, 700/229; 320/109
See application file for complete search history.

(56) References Cited

U.S. PATENT DOCUMENTS

| | | | | |
|---|---|---|---|---|
| 582,436 | A * | 5/1897 | Ridgway | 104/99 |
| 3,696,890 | A * | 10/1972 | Armstrong | 186/40 |
| 4,609,922 | A * | 9/1986 | Boegli et al. | 340/825.58 |
| 5,894,760 | A | 4/1999 | Caveney | |
| 5,939,857 | A * | 8/1999 | Madigan et al. | 320/107 |
| 6,278,201 | B1 | 8/2001 | Brien et al. | |
| 6,373,380 | B1 * | 4/2002 | Robertson et al. | 240/425.5 |
| 6,412,757 | B1 * | 7/2002 | Ohno et al. | 267/36.1 |
| 6,443,686 | B1 | 9/2002 | Wiesler et al. | |
| 6,908,066 | B1 * | 6/2005 | Koenig | 246/122 A |
| 2004/0078957 | A1 * | 4/2004 | Forster et al. | 29/601 |

OTHER PUBLICATIONS

"AMHS", Brooks Automation, Inc., reprinted from the Internet at: http://www.brooks.com/pages/195_amhs.cfm?outputtype=print, 1 pg., no date.
"OneFab AMHS", Brooks Automation, Inc., reprinted from the Internet at: http://www.brooks.com/pages/1751_onefab_amhs. cfm?outputtype=print, 1 pg., no date.

(Continued)

*Primary Examiner*—Mark T. Le
(74) *Attorney, Agent, or Firm*—Rose Alyssa Keagy; W. James Brady; Frederick J. Telecky, Jr.

(57) ABSTRACT

The present invention is directed to a material handling system (100) and method (200) for isolating a carrier mechanism (110) from the system. The system (100) comprises a track (103) having a channel (105), a turntable (115), and a carrier mechanism (110) coupled to the track structure via the channel. The system (100) further comprises a maintenance station (125), comprising a stub track (130), wherein the stub track is operably coupled to the track structure (103) via the turntable (115). The maintenance station (125) further comprises a power supply (135) and one or more connectors (140) operable to electrically couple the carrier (110) to the power supply (135). One or more stop blocks (145) are provided which are removably coupled to the stub track (130), wherein the stop blocks each comprise a body (155) having a rod (160) extending therefrom. The rod (160) is operable to pass through a hole (165) in the stub track channel (132), wherein a pin (180) is removably coupled to the rod, therein selectively fixing the stop block (145) to the track (130).

11 Claims, 3 Drawing Sheets

OTHER PUBLICATIONS

"AeroLoader", Brooks Automation, Inc., reprinted from the Internet at: http://www.brooks.com/pages/200_aeroloacer.cfm?outputtype=print, 1 pg., no date.

"AeroTrak", Brooks Automation, Inc., reprinted from the Internet at: http://www.brooks.com/pages/196_aerotrak.cfm?outputtype=print, 1 pg., no date.

* cited by examiner

OVERHEAD MATERIAL HANDLING SYSTEM AND TRACK BLOCK

FIELD OF THE INVENTION

The present invention relates generally to a material handling system, for example, in a semiconductor manufacturing facility, and more particularly to a maintenance station associated therewith.

BACKGROUND OF THE INVENTION

Material handling systems are commonly used in manufacturing environments, wherein the material handling systems transport payloads between various locations or processes. Conventional material handling systems comprise conveyors, track systems, robotic systems, as well as various other systems, and are typically floor-mounted or ceiling-suspended structures. Floor-mounted structures are typically easier to maintain than their ceiling-mounted counterparts, however the floor-mounted material handling systems can take up valuable real estate in a manufacturing facility. Furthermore, the floor-mounted systems can congest the manufacturing environment when used with various other manufacturing equipment, thus making pedestrian navigation through the production floor more difficult. Accordingly, where appropriate, overhead material handling systems can provide the required transportation of payloads while maximizing floor space utilization, since the overhead systems typically occupy unused overhead or ceiling areas of the production space.

Various types of overhead material handling systems have been developed over the years; one of the most popular being the monorail system, wherein a material carrier travels between the various locations or processes along a suspended track. An exemplary conventional material carrier is generally self-propelled, wherein the material carrier has an internal power source and drive motor, thus enabling the carrier to translate itself along a non-powered monorail.

Maintenance, carrier testing, and various other off-line functions associated with the material carrier, however, can be difficult to perform while the material carrier is physically coupled to the monorail track. Typically, the material carrier is removed from the track in order to perform such maintenance or off-line functions. Removing the conventional material carrier typically comprises de-energizing the carrier, removing the drive motor, and/or removing couplings that couple the carrier to the track. Such a removal can be cumbersome and time consuming, especially when performed in an overhead environment, since the person removing the carrier is typically standing on a ladder or other elevated structure.

Furthermore, in a typical production environment, several material carriers concurrently travel along the same main monorail track. In order to not inhibit production flow during maintenance of a particular material carrier, the carrier is conventionally moved to a stub track for removal. The stub track typically comprises a small section of non-powered track coupled to the main monorail track, wherein a path of the carrier along the main track can be momentarily switched to divert the carrier onto the stub track. In order to prevent the carrier from traveling off an end of the stub track during the diversion, removable track blocks are placed at the end of the stub track. In conventional systems, when the material carrier is removed from the stub track in order to perform maintenance or other functions, the track blocks are not typically removed from the stub track. Consequently, the conventional track blocks have not been designed for easy removal and replacement, and generally comprise various screws or bolts that are screwed onto the track. Such conventional track blocks can be cumbersome to remove, especially in an overhead environment.

Therefore, it would be highly desirable to provide an overhead material handling system, wherein the material carrier can be maintained while remaining on an overhead stub track. Furthermore, when removal of the carrier from the stub track is necessary, an improved track block is desirable, such that the improved track block can be easily removed and replaced in the overhead environment.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present invention is generally directed toward a material handling system and method for isolating a carrier mechanism from the material handling system. According to one exemplary aspect of the invention, the material handling system comprises a track structure having a channel generally defined therein, wherein the track structure comprises a turntable rotatably coupled thereto. A rotational position of the turntable, therefore, generally defines one or more paths along the channel. A carrier mechanism is provided, wherein the carrier mechanism is generally coupled to the track structure via the channel, and wherein the carrier mechanism is operable to travel along the one or more paths.

In accordance with another exemplary aspect of the invention, a maintenance station is further provided, wherein the maintenance station is operable to isolate the carrier mechanism from the material handling system. The maintenance station, for example, comprises a stub track having a channel generally defined therein, wherein the stub track is operably coupled to the track structure via the turntable. Furthermore, in order to isolate the carrier mechanism from the rest of the material handling system, one of the one or more paths leads to the stub track. The maintenance station further comprises a power supply and one or more connectors operable to electrically couple the carrier mechanism to the power supply when the carrier mechanism is at a docking position along the stub track.

One or more stop blocks are further provided, according to another exemplary aspect of the invention, wherein the one or more stop blocks are removably coupled to the stub track, and wherein the one or more stop blocks generally prevent a movement of the carrier mechanism beyond one or more respective ends of the stub track. The one or more stop blocks each comprise a body having a rod extending therefrom, wherein the rod comprises a radial thru-hole at one end thereof. Furthermore, the channel of the stub track comprises one or more holes therethrough, wherein the end of each rod is operable to extend through the respective hole in the channel of the stub track. A pin is further provided, wherein the pin is removably coupled to the rod via the thru-hole in the rod. The coupling of the pin with the rod therein selectively sandwiches the channel of the stub track between the pin and the body of the stop block, wherein the stop block is selectively generally fixed with respect to the stub track. Such a stop block generally permits an expedient isolating of the carrier mechanism from the material handling system.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
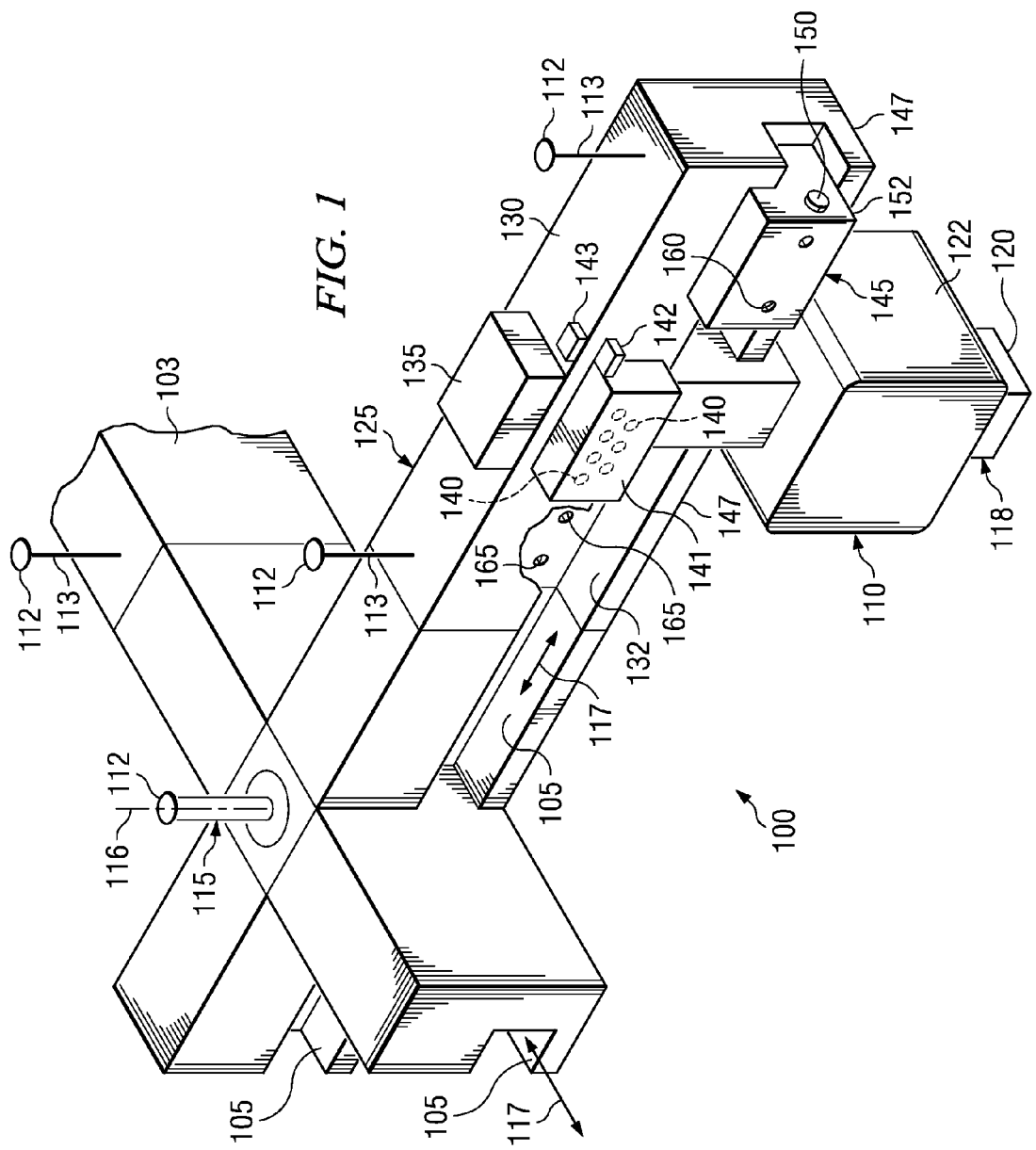
FIG. 1 is a partial perspective view of an exemplary material handling system according to one aspect of the present invention.

The present invention is directed towards a material handling system, and more particularly, to a maintenance station associated therewith. Accordingly, the present invention will now be described with reference to the drawings, wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details.

Referring now to the figures, FIG. 1 illustrates an exemplary material handling system 100 according to one aspect of the present invention. Generally, the material handling system 100 comprises a track structure 103, wherein the track structure generally comprises one or more channels 105 defined therein. The material handling system 100 further comprises a carrier mechanism 110 associated with the track structure 103, wherein the carrier mechanism is operable to travel along the one or more channels 105. The exemplary track structure 103 illustrated in the figures generally comprises a monorail-type structure, however any track structure, such as dual rail structures, are also contemplated as falling within the scope of the invention. The track structure 103, for example, is further suspended from a ceiling structure 112 by a plurality of hangers 113.

The track structure 103 further comprises a turntable 115, wherein the turntable is operable to rotate about an axis 116. A rotational position of the turntable generally defines one or more paths 117, along which the carrier mechanism 110 travels. The turntable 115, for example, is operable to rotate about the axis 116, therein directing the carrier mechanism 110 along one of the one or more paths 117. The rotation of the turntable 115, for example, can be accomplished manually by an operator, or automatically by a motor or the like.

According to one exemplary aspect of the present invention, the carrier mechanism 110 comprises a substrate carrier 118, wherein the substrate carrier is operable to retrieve and dispatch one or more substrates (not shown) at one or more processing stations (not shown) situated along the one or more paths 117. For example, the substrate carrier 118 comprises a retractable gripper 120 coupled to a gripper motor (not shown), wherein the gripper motor is operable to extend and retract the gripper from a body 122 of the carrier mechanism 110. The gripper is further operable to grip the one or more substrates (e.g., a cassette containing a plurality of substrates) for transportation between processes along the one or more paths 117. The carrier mechanism 110, for example, further comprises a rechargeable power supply (not shown) coupled to a carrier motor (not shown), wherein the carrier motor is operable to translate the carrier mechanism along the one or more channels 105, as will be understood by one of ordinary skill in the art.

In accordance with another exemplary aspect of the present invention, the material handling system 100 further comprises a maintenance station 125, wherein the maintenance station comprises a stub track 130 operably coupled to the track structure 103 via the turntable 115. The stub track 130 further comprises a channel 132 generally defined therein, wherein the channel of the stub track is selectably coupled to the one or more channels 105 of the track structure 103 via the rotational position of the turntable 115. For example, the turntable 115 can be manually or automatically rotated such that at least one of the one or more paths 117, along which the carrier mechanism 110 travels, leads to the stub track 130.

The maintenance station 125, for example, further comprises a power supply 135 and one or more connectors 140 (illustrated in phantom) associated therewith. The one or more connectors 140, for example, are operable to electrically couple one or more contacts (not shown) associated with the carrier mechanism 110 to the power supply 135 when the carrier mechanism is at a docking position 141 along the channel 132 of the stub track 130. For example, the one or more connectors 140, and/or the one or more contacts associated with the carrier mechanism 110 comprise one or more compliant springs (not shown), wherein the compliant springs generally exert a force between the respective contact and connector, therein providing a good electrical connection therebetween.

The power supply 135, for example, is operable to provide one or more voltages to the carrier mechanism 110 via the one or more connectors 140, wherein the one or more voltages generally facilitate one or more functions of the carrier mechanism, such as raising and lowering the grippers 120, recharging the rechargeable power supply (not shown), or other operations associated therewith. For example, the power supply 135 can provide both a low voltage (e.g., approximately 24 volts or less) and a high voltage (e.g., approximately 40 volts or more) to the carrier mechanism 110 via the one or more connectors 140 when the carrier mechanism is docked at the maintenance station 125. Furthermore, the one or more connectors 140 can provide an electrical connection for downloading data associated with the carrier mechanism 110 to a control computer (not shown) associated with the material handling system 100. In one alternative, the carrier mechanism 110 comprises a wireless communication transponder 142, such as an infrared or RF transponder, and the stub track 130 comprises a wireless communication base station 143 operable to communicate with the transponder when the carrier mechanism 110 is docked at the maintenance station 125. Such communication, for example, may comprise data associated with the carrier, such as material handling history, faults associated with the material handling system 100, or other data associated with the carrier or material handling system.

Figure 2:
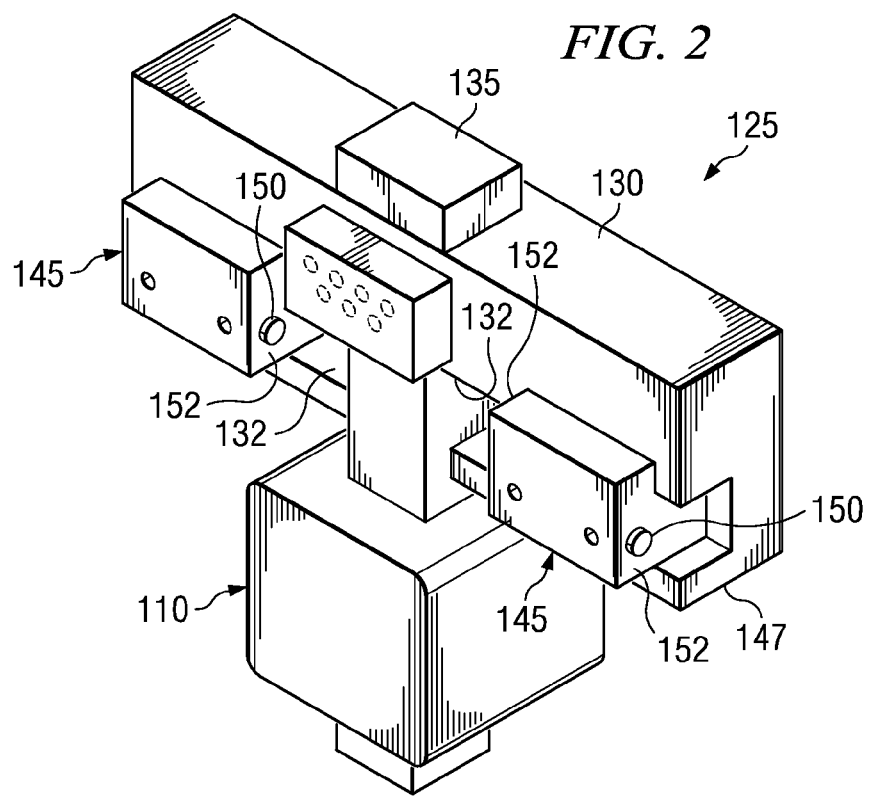
FIG. 2 is a perspective view of an exemplary maintenance station in accordance with another aspect of the present invention.

In accordance with another exemplary aspect of the present invention, the maintenance station 125 further comprises one or more stop blocks 145 removably coupled to one or more ends 147 of the stub track 130. When coupled to the stub track 130, the one or more stop blocks 145 generally prevent a movement of the carrier mechanism 110 beyond the one or more respective ends 147 of the stub track, as illustrated in FIG. 2. The one or more stop blocks 145, for example, further comprise one or more generally resilient bumpers 150 associated with one or more ends 152 thereof, wherein the one or more generally resilient bumpers are operable to generally prevent damage to the carrier mechanism 110 if the carrier mechanism impacts the stop block. The bumpers 150, for example, are comprised of rubber or any material operable to provide sufficient shock absorbency. Alternatively, the bumpers 150 comprise one or more mechanical shock absorbers, such as damped springs or the like.

Figure 3:
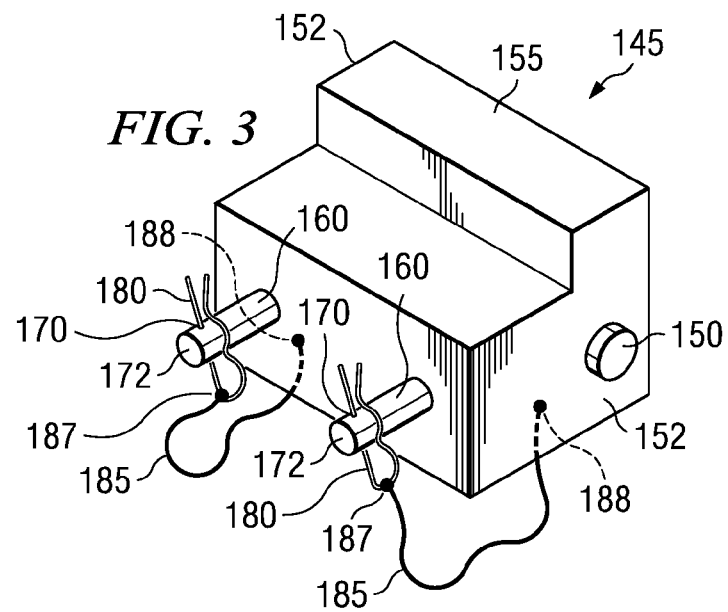
FIG. 3 is a perspective view of an exemplary stop block in accordance with another aspect of the present invention.
Figure 4A:
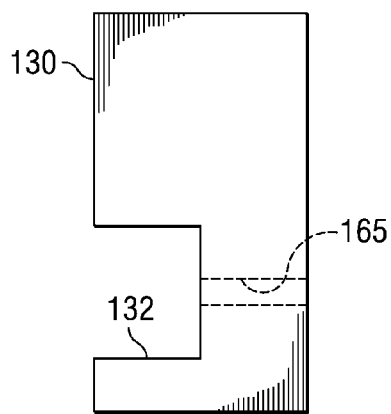
FIGS. 4A and 4B are side elevation views of an exemplary stub track, with and without a stop block, in accordance with still another exemplary aspect of the present invention.
Figure 4B:
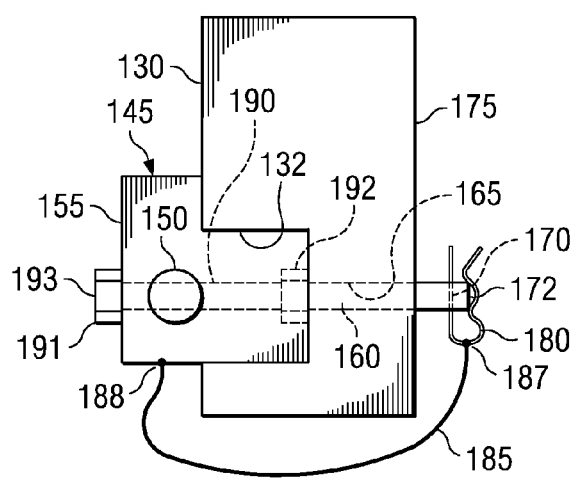

An exemplary stop block 145 is illustrated in perspective view in FIG. 3, wherein the block generally comprises a body 155 having one or more rods 160 extending therefrom. The body 155, for example, is generally L-shaped when viewed from one end 152, and may be comprised of various materials. Preferably, the body 155 is comprised of a lightweight material such as aluminum. FIGS. 4A and 4B further illustrate a side view of the exemplary stub track 130 discussed above. In FIG. 4A, the stub track 130 is illustrated without the stop block 145 coupled thereto, wherein the channel 132 of the stub track comprises one or more holes 165 extending therethrough (illustrated in phantom). FIG. 1 further illustrates the one or more holes 165 in the channel 132. The one or more holes 165, for example, are generally proximate to the one or more ends 147 of the stub track, and correspond to the one or more rods 160 of each stop block 145. As illustrated in FIG. 4B, the stop block 145 is generally coupled to the stub track 130, wherein the one or more rods 160 generally extend through the one or more holes 165 in the channel 132.

According to another exemplary aspect of the invention, each of the one or more rods 160 comprises a radial thru-hole 170 at an end 172 thereof, as illustrated in FIG. 3. The end 172 of each rod 160 is further operable to extend through the respective hole 165 in the channel 132 of the stub track 130, as illustrated in FIG. 4B, such that the thru-hole 170 generally extends beyond a back face 175 of the stub track 130. Each stop block 145 further comprises a pin 180, such as a cotter pin, that is removably coupled to each rod 160, wherein the pin is operable to extend through the thru-hole 170 in the rod, therein selectively sandwiching the channel 132 of the stub track 130 between the pin and the body 155 of the stop block. The rod 160 further selectively fixes the stop block 145 with respect to the stub track 130. Consequently, a removal of the pin 180 from each thru-hole 170 generally facilitates the removal of the stop block 145 from the stub track 130.

According to another example, as illustrated in FIGS. 3 and 4B, each stop block 145 further comprises a tether 185, such as a chain, wire, rope, or the like, wherein a first end 187 of the tether is generally coupled to the pin 180, and a second end 188 of the tether is coupled to the body 155 of the stop block 145. Such a pin 180 and tether 185 generally permits an expedient removal of the stop block 145 from the stub track 130 while minimizing chances of losing the pin.

The one or more rods 160 associated with each stop block 145, for example, are generally fixed to the body 155 of the stop block, such as by an interference fit with one or more respective holes (not shown) in the body. Alternatively, the body 155 comprises a hole 190 extending therethrough wherein at least a portion of each rod 160 generally resides within the respective hole in the body. For example, each rod 160 comprises a threaded bolt 191, wherein a nut 192 is in threaded engagement with the bolt, and wherein the nut generally sandwiches the body 155 between a head 193 of the bolt and the nut, therein generally fixing the rod to the body. Alternatively, the rods 160 can be integral to the body 155, welded to the body, or coupled in any manner, and such arrangements are contemplated as falling within the scope of the present invention.

Figure 5:
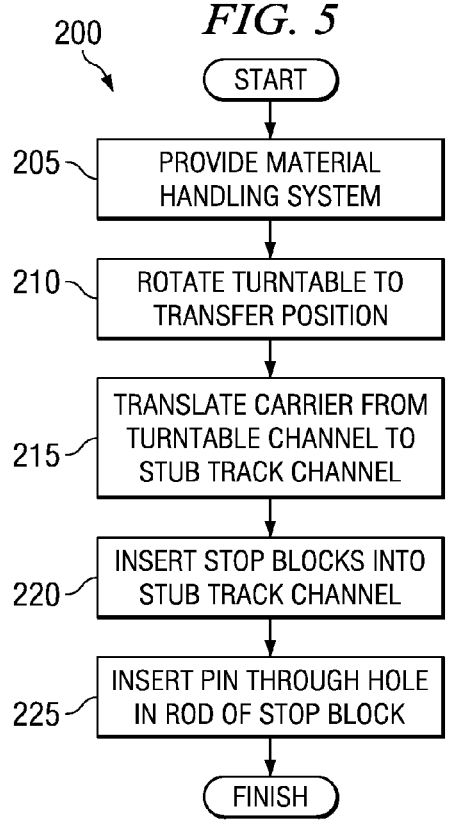
FIG. 5 is a flow chart of an exemplary method for isolating a carrier mechanism from a material handling system according to another exemplary aspect of the present invention.

According to still another exemplary aspect of the present invention, FIG. 5 is a schematic block diagram illustrating an exemplary method 200 for isolating a carrier mechanism coupled to a material handling system. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the systems illustrated and described herein as well as in association with other systems not illustrated.

As illustrated in FIG. 5, the method 200 begins with providing a material handling system comprising a carrier mechanism in act 205, wherein the material handling system further comprises a turntable and a stub track rotatably coupled to one another. The turntable and stub track, for example, each comprise a channel 105 and 132, respectively, as illustrated in FIG. 1. In act 210 of FIG. 5, the turntable is rotated to a transfer position, wherein the channel of the turntable aligns with the channel of the stub track. The rotation of the turntable in act 210, for example, may be performed by manually turning the turntable from an active position (e.g., wherein the carrier mechanism travels along a path used for transferring materials between one process and another) to an intermediate position (e.g., a transfer position, wherein the turntable is rotated such that the path of the carrier mechanism aligns with the stub track), wherein the intermediate position is generally only used for isolating the carrier mechanism from the material handling system. Alternatively, the rotation of the turntable can be automated by motors or the like, wherein the motors are controlled by a system controller.

In act 215, the carrier mechanism is translated from the turntable channel to the stub track channel. For example, the carrier mechanism is manually pushed by an operator from the turntable channel to the stub track channel. Alternatively, the carrier mechanism utilizes its internal power supply and motors to translate onto the stub track channel. One or more flags may be implemented to control the movement of the carrier mechanism along the stub track channel, wherein the carrier mechanism is operable to sense the flags to determine whether to stop or continue moving.

Act 220 comprises the act of inserting one or more stop blocks into the stub track channel, wherein a rod associated with each stop block extends through a respective hole in the stub track channel. It should be noted that wherein the stub track originally comprises no stop blocks, act 220 may be performed prior to act 215 for one end of the stub track, and may be performed again with another stop block at the other end of the stub track after the carrier mechanism is transferred onto the stub track channel.

In act 225, a pin is inserted through a hole in an end of each of the rods, therein sandwiching the stub track channel between the respective stop block and pin. The pin, therefore, generally fixes each stop block with respect to the stub track, and consequently, generally limits a movement of the carrier mechanism along the stub track channel. Furthermore, other operations can be performed while the carrier mechanism is on the stub track, such as electrically connecting the carrier mechanism to a power source while the carrier mechanism is at a docking position along the stub track channel. Two or more amounts of power can be provided to the carrier mechanism, wherein various maintenance and/or data acquisition activities can be performed using the differing amounts of power. Still further, the carrier mechanism can wirelessly communicate with a base station associated with the stub track, wherein activity data can be transferred between the carrier mechanism and the base station.

Although the invention has been shown and described with respect to a certain aspect or various aspects, it is obvious that equivalent alterations and modifications will occur to others skilled in the art upon the reading and understanding of this specification and the annexed drawings. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several aspects of the invention, such feature may be combined with one or more other features of the other aspects as may be desired and advantageous for any given or particular application. Furthermore, to the extent that the term "includes" is used in either the detailed description or the claims, such term is intended to be inclusive in a manner similar to the term "comprising."

What is claimed is:

1. A material handling system, comprising:
   a track structure having a channel generally defined therein, the track structure comprising a turntable rotatably coupled thereto, wherein a rotational position of the turntable generally defines one or more paths along the channel;
   a carrier mechanism generally coupled to the track structure via the channel, wherein the carrier mechanism is operable to travel along the one or more paths; and
   a maintenance station, comprising:
      a stub track having a channel generally defined therein, the stub track being operably coupled to the track structure via the turntable, wherein one of the one or more paths leads to the stub track;
      a power supply coupled to the stub track;
      one or more connectors operable to electrically couple the carrier mechanism to the power supply when the carrier mechanism is at a docking position along the stub track; and
   one or more stop blocks removably coupled to the stub track, wherein the one or more stop blocks generally prevent a movement of the carrier mechanism beyond one or more respective ends of the stub track;
   wherein the carrier mechanism comprises a wireless communication transponder, and wherein the stub track comprises a wireless communication base station, wherein the transponder is operable to communicate data associated with the carrier with the base station when the carrier is at the docking position.

2. The system of claim 1, wherein the channel of the stub track comprises one or more holes therethrough, and wherein the one or more stop blocks each comprise:
   a body having a rod extending therefrom, the rod having a radial thru-hole at an end thereof, wherein the end of the rod is operable to extend through the hole in the channel of the stub track; and
   a pin removably coupled to the rod, wherein the pin is operable to extend through the thru-hole in the rod, therein selectively sandwiching the channel of the stub track between the pin and the body of the stop block and selectively generally fixing the stop block with respect to the stub track.

3. The system of claim 2, wherein each stop block further comprises a tether, wherein a first end of the tether is coupled to the pin and a second end of the tether is coupled to the body.

4. The system of claim 2, wherein the body is comprised of aluminum.

5. The system of claim 2, wherein the body comprises a hole therethrough, and wherein a portion of the rod generally resides within the hole in the body.

6. The system of claim 5, wherein the rod comprises a threaded bolt, the system further comprising a nut in threaded engagement to the bolt, wherein the nut generally sandwiches the body between a head of the bolt and the nut, therein generally fixing the bolt to the body.

7. The system of claim 2, wherein the pin comprises a cotter pin.

8. The system of claim 2, further comprising one or more generally resilient bumpers coupled to the body at one or more ends thereof.

9. The system of claim 8, wherein the one or more bumpers are comprised of rubber.

10. The system of claim 8, wherein the one or more bumpers comprise one or more mechanical shock absorbers.

11. The system of claim 1, wherein the power supply is operable to provide a low voltage and a high voltage to the carrier via the one or more connectors.

* * * * *